United States Patent [19]

Coleman, Jr.

[11] Patent Number: 4,468,708
[45] Date of Patent: Aug. 28, 1984

[54] COMBINED DATA RATE REDUCTION SYSTEM

[75] Inventor: Charles H. Coleman, Jr., Redwood City, Calif.

[73] Assignee: Ampex Corporation, Redwood City, Calif.

[21] Appl. No.: 316,756

[22] Filed: Oct. 30, 1981

[51] Int. Cl.³ ............................................... H04N 9/49
[52] U.S. Cl. .................................. 358/310; 358/133; 358/135; 358/138; 358/335
[58] Field of Search ............... 358/310, 335, 133, 135, 358/138, 12, 13

[56] References Cited

U.S. PATENT DOCUMENTS

| | | | |
|---|---|---|---|
| 4,129,882 | 12/1978 | Limb | 358/13 |
| 4,227,204 | 10/1980 | Rossi | 358/13 |
| 4,301,466 | 11/1981 | Lemoine et al. | 358/310 |
| 4,323,916 | 4/1982 | Dischert et al. | 358/13 |

*Primary Examiner*—Richard Murray
*Attorney, Agent, or Firm*—Elizabeth E. Strnad; Roger D. Greer; Joel D. Talcott

[57] ABSTRACT

A method and apparatus are disclosed for performing a reduction of the data rate of a data stream for transmission through a transmission channel or recording and for subsequently reconstructing the original data stream upon receipt or during reproducing. The method and apparatus utilizes a combination of two processes, one of which eliminates or drops digital samples from the data stream to reduce the data rate for transmission and which subsequently reconstructs the original data stream using the unaltered and recovered digital samples to generate an interpolated value for each of the samples that had been dropped. The second process utilizes differential pulse code modulation for reducing the number of data bits per sample before sending the data stream through the transmission channel and for subsequently restoring the data to its original multi-bit form.

16 Claims, 9 Drawing Figures

COMBINED DATA RATE REDUCTION SYSTEM

This invention generally relates to digital data rate conversion or reduction and more particularly relates to a unique method and apparatus for performing digital data rate reduction of a data stream of digital samples from an original data rate to a lower data rate utilizing the combination of two separate processes and for subsequently reconstructing the original digital samples at the original data rate.

The research and development efforts in the field of video recording and particularly video magnetic recording have included significant efforts directed toward digitizing the video signal and recording and reproducing digital signals rather than an analog video information signal. Digital video signals may either be produced directly by a video camera and may be either composite or components of the video signal, or a conventional analog information signal may be sampled to provide the digital signals that are thereafter recorded and reproduced. In the event it is necessary to convert the analog signal into the digital domain, the digitizing is typically achieved by sampling the analog signal at a finite sampling rate which must exceed a predetermined minimum sampling rate in order for the analog signal to be subsequently reconstructed without unacceptable distortion of the signal quality.

The minimum sampling rate must satisfy what is generally referred to as the Nyquist criteria which requires the number of samples taken to be at least double the bandwidth of the signal of interest. For a NTSC format color signal, the minimum acceptable bandwidth is about 4.2 MHz which requires a sampling rate in excess of 8.4 MHz. For the PAL format color signal, a bandwidth of 5.5 MHz is necessary, which requires the sampling rate in excess of approximately 11 MHz. If sampling rates are in excess of these minimum values, then the conversion from the digital domain to the analog domain can be accomplished without incurring any significant distortion.

When recording a video signal on magnetic tape, it is also desirable for economic reasons to utilize the least amount of tape and it is therefore desirable to have sampling rates that are not significantly in excess of the minimum Nyquist requirements. Similarly, if the video signal to be recorded is already in the digital domain, it is desirable for the same reasons to have fewer digital words and also digital words of fewer bits to be recorded. However, in the event that it is necessary to sample the analog video information signal, it is desirable for operational reasons to sample the signal, whether it is a NTSC or PAL format signal, at some integral multiple of the frequency of the unmodulated color subcarrier, hereinafter referred to as $F_{sc}$. The sampling rate of three times the color subcarrier frequency ($3F_{sc}$) has been commonly used since it is the lowest integral multiple of the color subcarrier frequency that is in excess of the Nyquist criteria. However the $3F_{sc}$ sampling rate also poses certain operational disadvantages in the recording and reproducing process, generally in color processing, color decoding and other signal processing operations, that are not specifically related to distortion, which may be experienced as the direct result of the selection of a sampling rate that is an odd multiple of color subcarrier frequency.

Because of these operational considerations, it is desirable to use the sampling rate that is four times the unmodulated color subcarrier frequency ($4F_{sc}$), but as should be appreciated, this results in a greater number of samples than is required to satisfy the Nyquist criteria to provide faithful data transmission and an undistorted regeneration of the analog signal and therefore represents some waste in terms of the required transmission and channel bandwidth and utilization of the recording medium.

To reduce the number of samples that are actually recorded and reproduced, it has been proposed to sample the analog digital information signal with the sampling rate of $4F_{sc}$ and then convert the samples obtained to a lower $3F_{sc}$ rate for recording and upon reproduction to again convert the $3F_{sc}$ to the $4F_{sc}$ rate. It is also frequently suggested to make the $4F_{sc}$ to $3F_{sc}$ conversion by essentially multiplying by three to obtain the $12F_{sc}$ conversion by subsequently dividing by four to obtain the $3F_{sc}$ resulting conversion. The conversion may be done in steps, but in any case, basically requires a filtering and interpolation process that calls for the interpolation of at least two samples per subcarrier cycle (a $4F_{sc}$ sample rate would have four samples per subcarrier cycle) in the first conversion and at least the interpolation of three samples in the subsequent conversion from $3F_{sc}$ to b $4F_{sc}$. The digital apparatus required to implement this conversion is complex and expensive and it has the further drawback that the interpolated samples (which contain filtering errors and quantizing errors) would necessarily be used as the basis for interpolating other samples when the process is repeated as would occur in multiple generation recording. Therefore these errors would propagate and increase and would eventually introduce uncorrectable errors in the data multiplying the basic advantage that characterizes digital operations.

In accordance with the present invention, an improved method and apparatus is disclosed for converting the digital data stream of the first data rate to a lower data rate for the purpose of transmission through an information channel and for subsequently converting the lower data rate back to the higher first data rate upon receipt of the transmitted data stream transmitted through the information channel, and is accomplished in a manner whereby errors that may be introduced in the data stream by the conversions will not propagate and increase during multiple generation data recording or transmission. The method and apparatus provides for converting the sample rate of the video information signal from an original sample rate of four times the frequency of the unmodulated color subcarrier ($4F_{sc}$) to a lower data rate of three times the frequency of the color subcarrier ($3F_{sc}$) for recording or the like and for subsequently converting the lower sample rate back to the four times color subcarrier frequency and is achieved in a unique manner whereby the first conversion from $4F_{sc}$ to $3F_{sc}$ is accomplished by merely dropping or removing one sample per subcarrier cycle and the second conversion is accomplished by applying the unaltered samples of the $3F_{sc}$ sample data rate data stream to a digital filter which generates an interpolated value for insertion into the data stream at the location of each previously dropped sample to thereby reconstruct the data stream at the $4F_{sc}$ data rate.

The present invention utilizes the above indicated process in that digital samples are dropped prior to recording or transmission through an information channel and subsequently of the recording a digital filter is used to provide an interpolated value for the previously dropped samples. However, in addition to the utilization of that process, the present invention also uses yet another data rate reduction process, i.e., that of differential pulse code modulation to reduce the number of bits of the multi-bit digital words of the remaining samples that are recorded or transmitted. The combination of the dropped sample process and the differential pulse code modulation process yields a total data rate reduction whose percentage of the original rate is equal to the product of the individual percentages.

Accordingly, it is an object of the present invention to provide a method and apparatus for reducing the data rate of a data stream required for recording or transmitting digitized information signals, and particularly television signals, that results in a significant reduction of the data rate without incurring appreciable degradation of the resulting signal upon reconstruction of the original data stream.

Another object of the present invention is to provide a method and apparatus for reducing the data rate of a data stream which utilizes two separate reduction processes in a unique combination whereby both processes simultaneously work on the same input data without significant mutual interference.

Yet another but more detailed object of the present invention is to provide an improved method and apparatus for providing a reduction in the data rate required for recording digitized television signals utilizing two separate processes, each of which appreciably reduces the data rate and which, due to their simultaneous operation on the input data result in a final rate that is the product of the reductions performed by each, and which after recording or transmission, results in the reconstruction of the original input data rate without significant degradation.

These and other objects and advantages of the present invention will become apparent upon reading the following detailed description, while referring to the attached drawings, in which.

Broadly stated, the present invention is directed to a method and apparatus for reducing the data rate of a digital data stream for the purpose of recording or transmitting a reduced data rate and for thereafter reconstructing the original data stream at the original data rate upon receipt of the data or upon reproduction of data. The method and apparatus of the present invention achieves the reduction of the data rate by combining two distinct reduction processes in a manner whereby the reduction obtained by each process does not detrimentally affect the other and the overall data rate reduction is the product of the reductions from each process. Thus, as is described herein, individual reductions of 25 percent each result in a final rate of reduction that is 56.25 percent of the original data being recorded or transmitted through a transmission channel.

The first process involves converting a digital data stream of one data rate to a second lower data rate and is done simply by dropping or discarding data samples or data words from the data stream at predetermined and constant intervals. The remaining unaltered data words of the data stream are then operated upon by the second process which will be hereinafter described. After recording and reproducing or transmitting the data rate through a transmission channel, the lower data rate data stream is subsequently converted back to its original form by inserting into the data stream an interpolated value for each of the dropped data words by using a digital filter which operates on the unaltered samples to generate interpolated values. The interpolated values are inserted into the data stream at the locations where the samples have previously been dropped.

The process is particularly adapted for use with digitized color video signals for the purpose of recording the same on a magnetic media. During subsequent reproducing, the original digitized color video information signal can be reconstructed by using the unaltered recorded data samples and providing an interpolated value for each of the samples that had been dropped prior to the recording. Of particular advantage is the fact that the digitized data stream that will be recorded will always consist of unaltered data words if the data words that are dropped are always at the same locations when the process is repeated.

Thus, if a digital data stream of data words comprises the samples that were taken at a $4F_{sc}$ data rate and the samples are converted to a $3F_{sc}$ data rate by dropping every fourth sample, it should be appreciated that the three remaining of every four samples are unaltered or noninterpolated and these data words can be recorded and subsequently reproduced and utilized to generate an interpolated value that is inserted between the unaltered samples for reconstruction of the digital data stream. If the interpolated value is subsequently dropped during a subsequent recording, i.e., a multiple generation recording, there will be no propagation or increasing of any errors, since the data samples that are remaining for subsequent recording and reproducing will always be unaltered and therefore available without distortion for use in generating the interpolated value for the original dropped sample during reconstruction of the digital data stream at the original $4F_{sc}$ data rate. If the video signal is originally sampled at a $4F_{sc}$ data rate and every fourth sample dropped to thereby convert the data stream to a $3F_{sc}$ data rate, it should be appreciated that the reduction in the data rate through the use of this process is 25 percent, or stated in other words, results in a data rate that is 75 percent of the original data rate.

The other process by which the data rate is reduced utilizes differential pulse code modulation and operates on the data stream after the first process has dropped samples, but before recording or transmission through an information channel. The process also reconstructs the data stream before the other process generates the interpolated value at the locations where the samples had been previously dropped. Since the digital data words or samples are normally eight bit data words in a broadcast quality system, the use of the differential pulse code modulation process reduces the number of bits per data word from an eight bit data word to a six bit data word for recording or transmission through an information channel, and through the use of the reverse portion of the process, i.e., the decoding portion of it, the six bit data words can be used to reconstruct eight bit data words which in turn can be operated upon by the digital filter portion of the first process to provide the original data stream comprised of eight bit data words. By effectively reducing eight bit words to six bit words by operation of the second process of differential pulse code modulation, the effective data rate is also reduced by 25 percent.

Through the combination of both the processes, each of which results in a data rate of 75 percent of the original, the resulting data rate that is recorded or transmitted is the product of the reductions of each and the product of 75 percent by 75 percent results in a final reduction of 56.25 percent of the original data that is actually being recorded or transmitted by the apparatus. The two processes can simultaneously operate on the same input data signal without significant mutual interference because of the truism that, since the differential pulse code modulation process does not have to convey through the transmission channel or recording those samples which have been dropped, it does not have to predict them either. Those samples which must be conveyed can be predicted using their correspondingly timed and therefore nondropped previous samples.

The only constraints to the simultaneous use of the two processes as applied to the sampled NTSC format video signal is that the sampling rate of the input data must be some integral multiple of the subcarrier frequency, i.e., N times $F_{sc}$. The differential pulse code modulation process must use for predicting purposes, those samples that are integer multiples of N. Thus, with four times subcarrier sampling, for example, only samples which are four or integral multiples of four, samples previous to the predicted sample are eligible for use in the differential pulse code modulation predictor. This rule continues to be true even when some of the prediction points are in previous TV horizontal lines, although an exception exists in the case of a PAL format video signal, as will be hereinafter discussed. Virtually the only chance of one process affecting the other occurs when a quantizing error in the differential pulse code modulation process is made, for such an error would be present for application to the digital filter which uses the decoded samples from the differential pulse code modulating process to provdide an interpolated value in the locations of previously dropped samples. However, when such occurs, the single sample quantizing error is spread somewhat in time and at considerably reduced amplitude by the digital filter.

Figure 1:
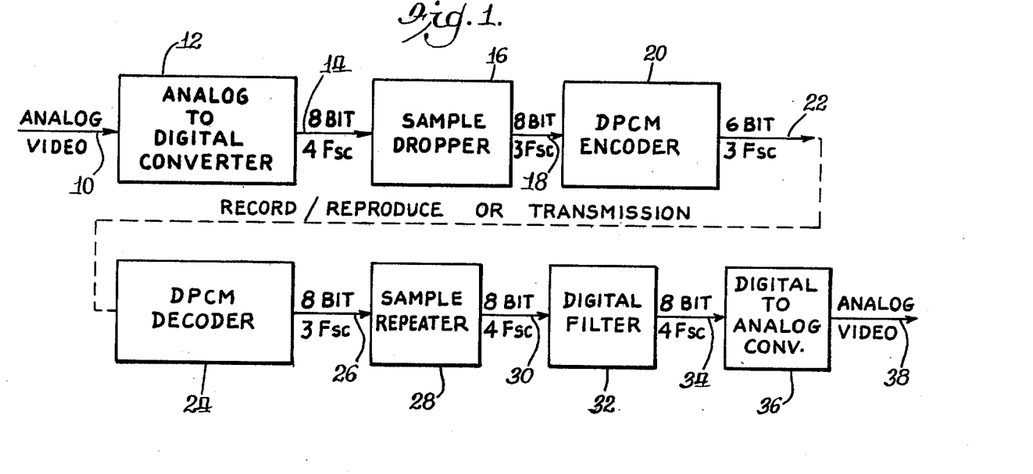
FIG. 1 is a block diagram of apparatus embodying the present invention which also can be used to practice the method of the present invention.

Turning now to the drawings, and particularly FIG. 1, a block diagram is shown which embodies the apparatus of the present invention and which can be used to practice the method of the present invention. An analog signal may be applied at input 10 to an analog-to-digital converter 12 which provides digital samples of the analog signal at a sampling rate that is preferably an integer multiple of the subcarrier frequency of the color video information signal. It should be appreciated that the analog-to-digital converter 12 is not an absolute requisite in the system inasmuch as it is possible for the digital counterpart of a video information signal to be provided directly to the present apparatus. Thus, the output of the analog-to-digital converter appearing on line 14 is in the form of a data stream of data words, each word representing the sampled value of the analog video signal wherein the sampling was done at a rate of preferably four times the color subcarrier frequency of the information signal. In the event that another device provided the appropriate digital representation of a scene, the line 14 may be the input to the apparatus of the present invention. It is also generally agreed that commercial quality broadcast equipment requires digital samples or data words having at least eight bits, with the eight bits representing 256 different values which can occur in the resulting signal. The eight bit data words at the $4F_{sc}$ rate appearing on line 14 are applied to a sample dropper 16 which effectively removes or drops every fourth sample or data word in the data stream and thereby results in an output on line 18 that continues to be eight bits, but is effectively reduced to a data stream having a $3F_{sc}$ data rate.

Figure 4:
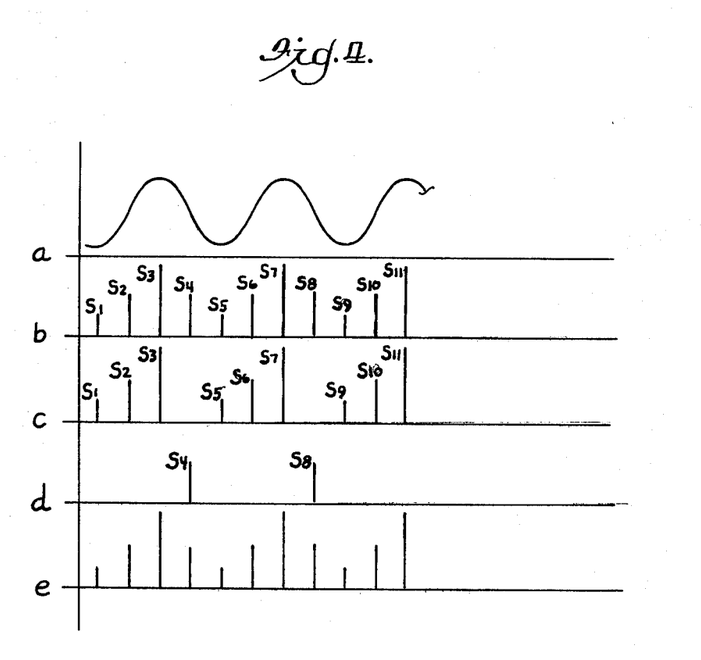
FIGS. 4a–4e are waveforms that are useful in describing the operation of portions of the apparatus shown in the block diagram of FIG. 1.

The sample dropper 16 which produces the $3F_{sc}$ data stream can be more readily understood by viewing the waveforms of FIGS. 4a through 4e. If an analog input signal is shown in FIG. 4a, and is sampled at a $4F_{sc}$ data rate, then there are four samples for each subcarrier cycle, which is shown by the representation of FIG. 4a, so that after the data stream passes through the sample dropper, every fourth sample is missing as shown in FIG. 4c, wherein samples $S_4$, $S_8$ are shown to be missing.

It is preferred that the remaining samples be reclocked or reordered in a manner that is uniform, i.e., at a rate corresponding to three samples per subcarrier cycle so that a uniform data rate will be provided and no gaps will be present where samples had previously been located. By viewing the samples shown in FIG. 4c, it should be appreciated that the gaps between samples $S_1$ and $S_2$ or $S_2$ and $S_3$, for example, represent the $4F_{sc}$ sampling rate which is well in excess of the Nyquist criteria, but that the gap between samples $S_3$ and $S_5$ would, if repeated on a uniform basis, represent a rate of $2F_{sc}$ which is below the Nyquist minimum. However, for each cycle of subcarrier there exists three samples, therefore making an average sampling rate of $3F_{sc}$ which is still in excess of the Nyquist minimum.

Data on line 18 is then applied to a differential pulse code modulation encoder 20 which operates in a known manner to provide a coded six bit data word at the output for each eight bit data word input thereto so that the resulting reduction of two bits per word represents a 25 percent reduction of the total number of bits that must be recorded or transmitted through an information channel represented by line 22. Upon reproducing or receipt of a transmission, the six bit word data stream is then decoded by the differential pulse code modulation decoder 24 to result in the eight bit data words at the $3F_{sc}$ rate appearing on line 26 and this is applied to a sample repeater 28 which operates to repeat every third sample to thereby provide an eight bit $4F_{sc}$ data stream and the data stream appears on line 30 which is applied to a digital filter 32 that operates to provide an interpolated value for the repeated sample and thereby reconstruct the eight bit data word data stream at the $4F_{sc}$ rate on line 34 which, assuming no errors are present, will be identical to that which was previously applied on line 14 as the input to the sample dropper 16. Finally, the data stream on line 34 can be applied to a digital-to-analog converter 36 if desired, which produces an analog video signal on line 38.

A portion of the apparatus that accomplishes the sample repeating operation shown by block 28 as well as the sample dropping operation shown by block 16 will now be described in connection with FIGS. 7, 8 and 9.

The data stream that has been sampled at a $4F_{sc}$ rate has every fourth sample removed to thereby provide a $3F_{sc}$ data stream which can be either recorded or transmitted through an information channel. When the data stream is received upon reproducing in the case of the information having been recorded or merely received if transmitted through an information channel, the data in the $3F_{sc}$ data stream is preferably converted to the $4F_{sc}$ data rate and a gap or dummy sample is provided in the data stream at each location where a sample had been previously dropped so that the digital filter 32, such as that shown in FIG. 2, can properly operate. It is easier as a practical matter to repeat a previous sample in the location where a sample had been dropped rather than provide a gap, although either is permissible, since the value of the repeated sample or gap is ignored anyway, and the output of the digital filter 32 is used for inserting the interpolated sample value from the neighboring samples that are unaltered. Circuitry which accomplishes the reclocking of the data to provide the $4F_{sc}$ data rate data stream and with a repeated sample present at each location where a sample had been previously dropped is shown in FIG. 7 which will be explained in conjunction with the timing diagrams of FIG. 8. It will also be apparent from the following description that the circuitry of FIG. 7, when modified in a manner that will be subsequently described, will drop every fourth sample and also reclock the $4F_{sc}$ data stream to a data rate of $3F_{sc}$ with no gaps or spaces therein. The manner in which a sample is repeated and the data stream reclocked can best be understood from the timing diagrams of FIG. 8, and the manner in which a sample is dropped and the data stream reclocked from $4F_{sc}$ to $3F_{sc}$ can be readily understood from the timing diagrams of FIG. 9.

Figure 9:
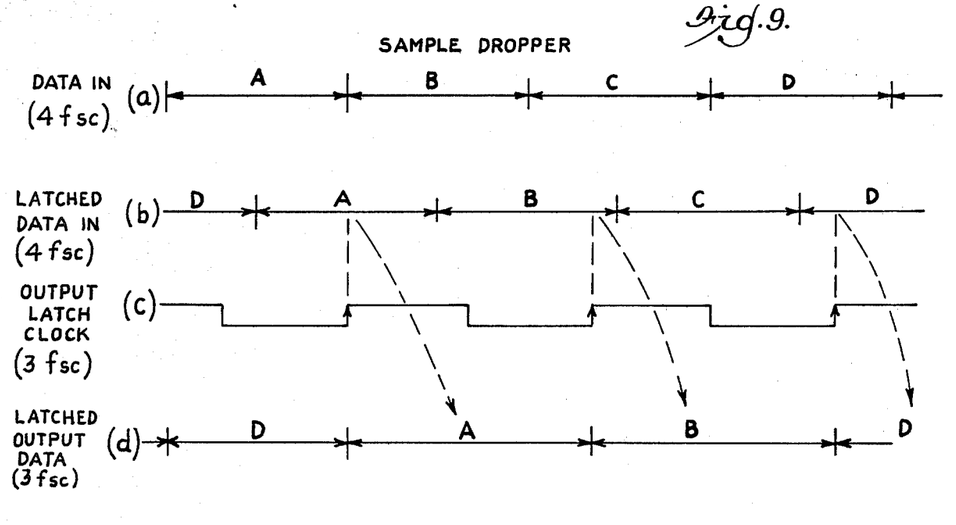
FIGS. 9a, 9b, 9c and 9d represent timing diagrams for the sample dropper circuitry shown in FIG. 7.

Turning initially to the sample dropper timing diagrams of FIG. 9, FIG. 9a shows the data of the data stream being presented to the circuitry which will be described. The samples per subcarrier cycle are present and are illustrated as data words A, B, C and D. When the input latch is clocked, the data is latched in at the clock time as shown in FIG. 9b. The output of the input latch is applied to a second output latch and it is clocked at a different clock rate which is at a $3F_{sc}$ rate, with the clock timing being synchronized so that the output latch is clocked in the manner as shown in FIG. 9c, i.e., at each of the positive-going transitions. When latched, the data that is presented to the latch appears at its output which results in a $3F_{sc}$ rate and a sample being dropped during each subcarrier cycle. Thus, one data word out of each four is dropped which, in the illustrated embodiment of FIG. 9, results in sample C being dropped, the output produced resulting in data words A, B and D being present at a $3F_{sc}$ rate as shown.

Figure 7:
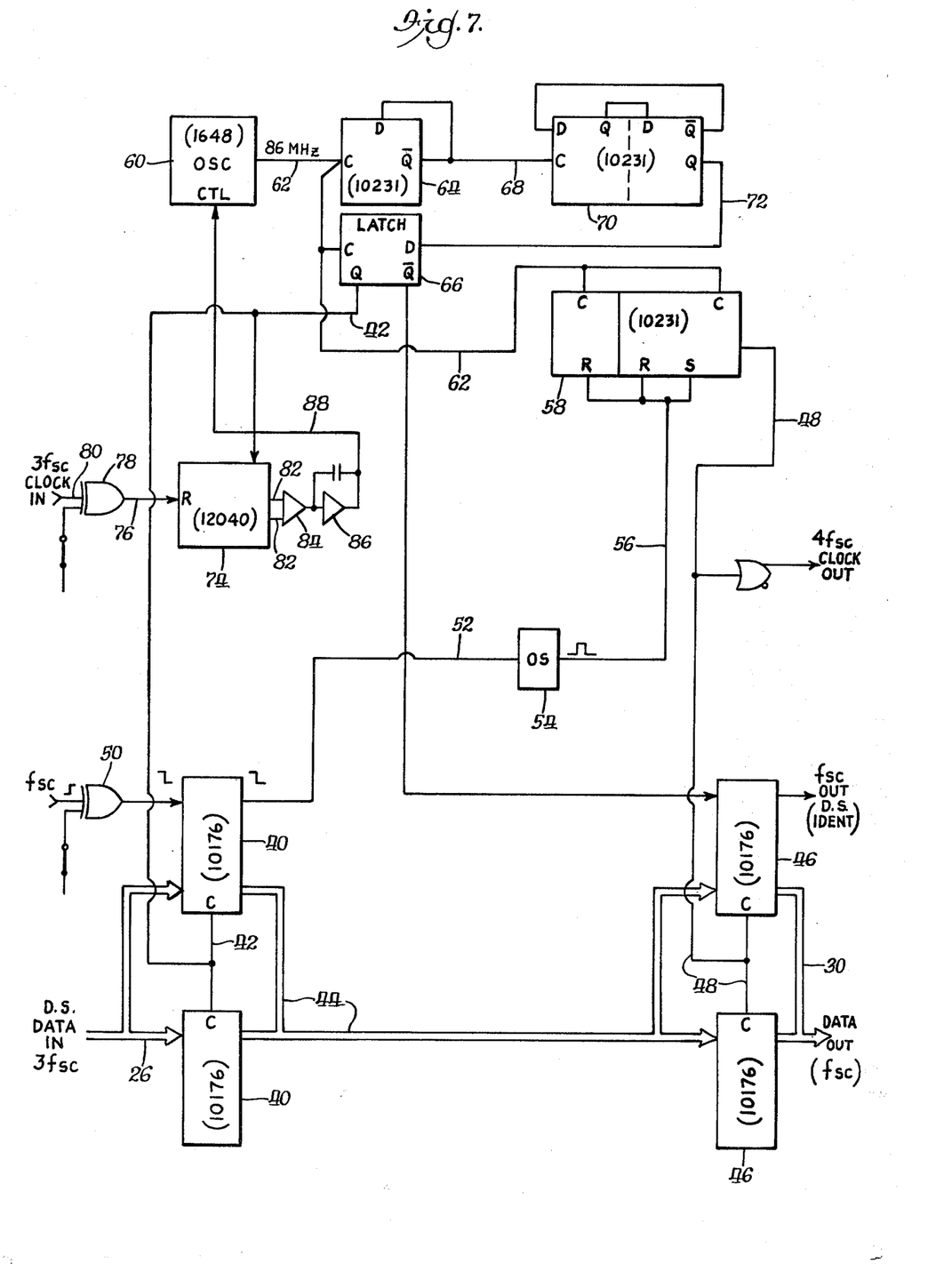
FIG. 7 is a schematic diagram of the sample dropper circuitry shown in the block diagram of FIG. 1.
Figure 8:
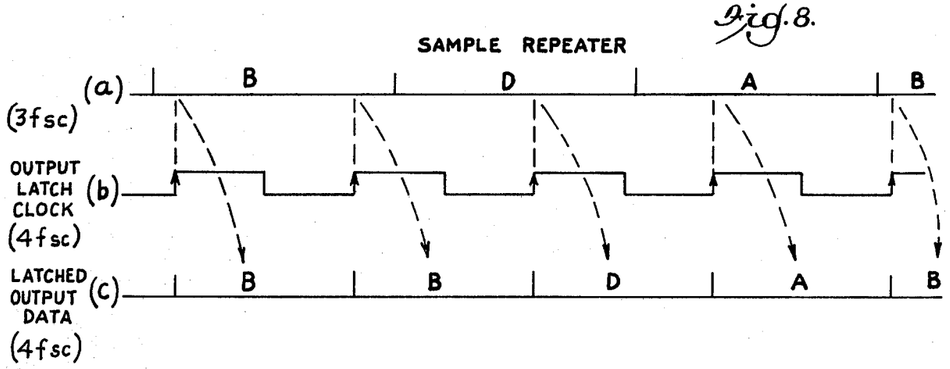
FIGS. 8a, 8b and 8c represent timing diagrams for the sample repeater circuitry shown in FIG. 1.

Turning now to the timing diagrams for the sample repeater shown in FIG. 8, the $3F_{sc}$ data rate data stream is applied to the circuitry shown in FIG. 7. The data stream includes the data words A, B and D and a $4F_{sc}$ clock is used to latch in the input data into an input latch as shown in FIG. 8b, wherein the positive-going transition of the $4F_{sc}$ clock clocks the latch and thereby latches in the data that is present at the time of the transition. As shown in FIG. 8c, there are two positive-going transitions of the clock when word B is present at the input latch which results in a repeating of the data word B followed by a single latching of data word D and A. This results in a $4F_{sc}$ data rate data stream being applied to the digital filter and the second occurrence of the word B is ignored and the output of the digital filter applied to provide the reconstructed data word C that had been dropped by the sample dropper circuitry previously described with respect to the timing diagrams of FIG. 9.

Turning now to the specific circuitry that can accomplish the sample repeating operation described with respect to FIG. 8, the $3F_{sc}$ data stream is presented on input line 26 which actually comprises eight lines, each of which carries one bit of the eight bit word of the data stream. The line 26 is connected to the inputs of latches 40 which are clocked by a clock signal on line 42 that is occurring at a clock rate of $3F_{sc}$, i.e., the rate of the input data on line 26. The clock on line 42 is appropriately timed so that the data is present and stable at the input of latches 40 before it is clocked into them. The data that is clocked into them appears on output line 44 and is occurring at a $3F_{sc}$ data rate. Line 44 is coupled to the input of another set of output latches 46 that are clocked by a clock signal on line 48 which is at the clock rate of $4F_{sc}$ as shown in FIG. 8b, so that the data that appears on the output line 30 of the latches 46 is as shown in FIG. 8c. The clock signal on line 48 is at the $4F_{sc}$ rate and is timed relative to the data on line 44 in the same relative timing relationship as shown in FIGS. 8a and 8b. Thus, the output on line 30 is a $4F_{sc}$ data rate data stream having one sample repeated, with the sample being repeated being a dummy sample that is subsequently ignored and replaced by the output of the digital filter as previously discussed.

The remainder of the circuitry shown in FIG. 7 provides the clock signals on lines 42 and 48 at the proper times to accomplish the proper operation that has been discussed. A single subcarrier frequency signal is applied to exclusive OR gate 50 that is clocked through the latch 40 and applied via line 52 to a one-shot multivibrator 54 which provides a narrow pulse on line 56 that is used to reset a 6-to-1 counter or divider 58 every subcarrier cycle. An oscillator 60 is provided which generates an 86 MHz clock signal on line 62 which is used to clock the 6-to-1 counter or divider 58 as well as a divide by 2 divider 64 and a latch 66. The divide by 2 divider 64 has an output line 68 which clocks a divide by 4 divider 70 which also has an output line 72 that is connected to the D input of the latch 66. The output line 42 is at a frequency of 86 MHz divided by 8 or $3F_{sc}$ (in the NTSC video television format) which provides the clock signal to clock the latches 40. Line 42 is also applied to one input of a phase detector 74, the other of which is supplied by line 76 which is the output of an exclusive OR 78 that has as an input line 80 which carries a component of the $3F_{sc}$ data stream. The phase detector 74 compares the phase of the data stream on line 80 with the latched output of the oscillator 60 and provides an output on lines 82 that are inverted by inverter 84 and applied through an operational amplifier 86 which has output line 88 that controls the phase of the oscillator 60. The phase detector and the associated circuitry are used to properly control the clock signal that is generated on line 42 to the data stream which is applied via line 80 so that the data is latched into the input latches 40 at the appropriate time. The output of the 6-to-1 divider or counter 58 present on line 48 provides the clock signal that is used to clock the data into the latches 46 as previously described.

As previously mentioned, the circuitry that can accomplish the sample dropping is essentially that shown in FIG. 7, but modified so that the clock frequency on line 42 is $4F_{sc}$ and the clock frequency on line 48 is $3F_{sc}$ with the timing of the clocks being controlled so that the circuitry operates in the manner shown in the timing diagram of FIG. 9. To provide the different frequencies on lines 42 and 48, it is only necessary for the divider 70 to be modified to be a 3-to-1 divider rather than a 4-to-1 divider and the counter 58 modified to operate as an 8-to-1 counter or divider rather than as a 6-to-1 counter divider as described with respect to the sample repeater. All other circuit components are identical and will operate as described.

Figure 2:
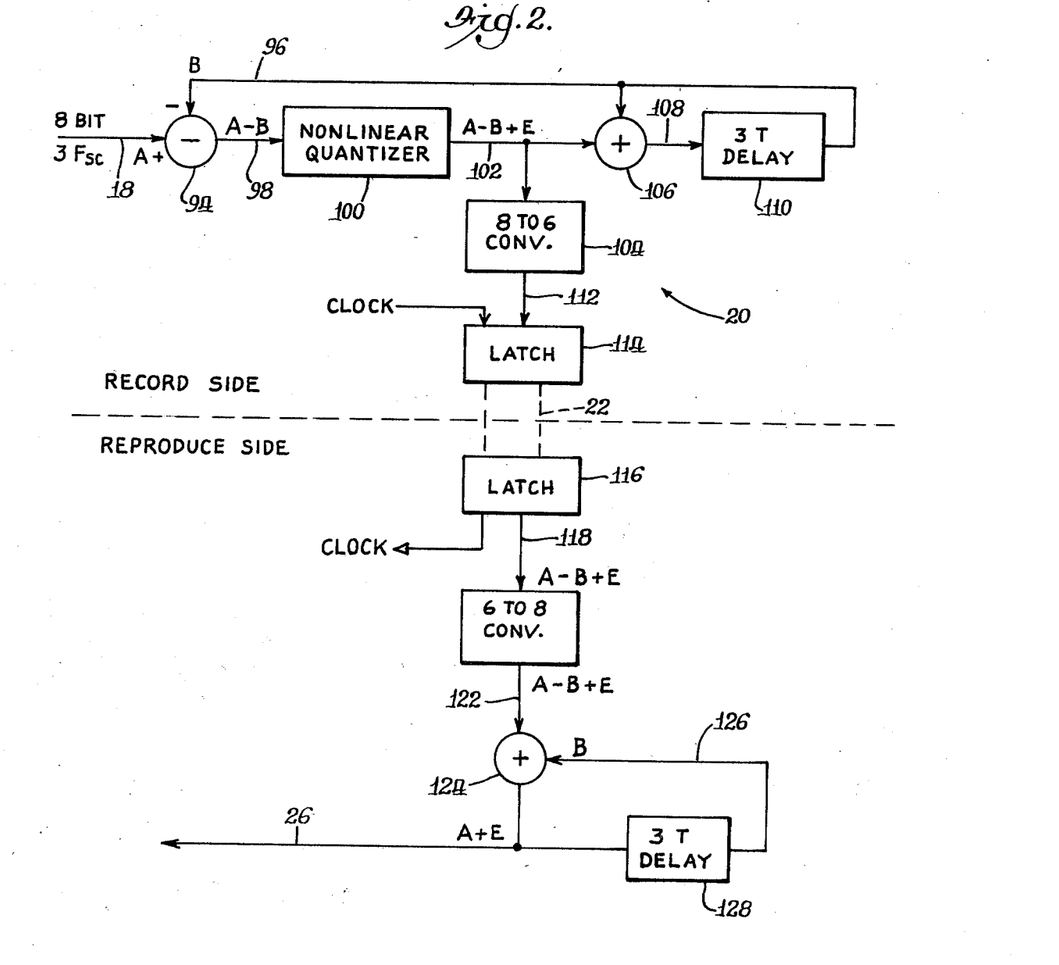
FIG. 2 is a block diagram of the portion of the apparatus shown in FIG. 1 and particularly illustrating the differential pulse code modulation encoder and decode thereof.

The differential pulse code modulation process is accomplished by the encoder 20 and decoder 24 which are of conventional design and are shown by the block diagram of FIG. 2. The digital samples that are applied to the encoder 20 via line 18, still represent samples that had been taken at a rate of $4F_{sc}$, but with one sample dropped per subcarrier cycle, every third sample is equivalent to samples that are actually spaced four samples apart from one another. Stated in other words, every third sample represents a sample that is taken at the same location in each subcarrier cycle. The six bit words that are transmitted through the information channel or recorded and reproduced by a suitable recorder, represent a digital code word which is the difference between the sample value and a prediction of the sample value that is obtained from previously transmitted samples. Thus, each six bit data word represents the difference in magnitude between a sample and a prediction of that sample and assuming that an efficient prediction system has been adopted, small differences are more probable than large differences. Therefore, if the number of difference values which can be transmitted is fixed, the value of the quantizing error introduced by the encoder 20 is minimized by employing a nonlinear quantizing law so that small differences are encoded more accurately than large differences. Similarly, by arranging the coder and encoder so that they both make the same prediction of each sample value, each signal sample can be recovered by the decoder 24 by adding the appropriate transmitted difference to the predicted sample value.

Figure 5:
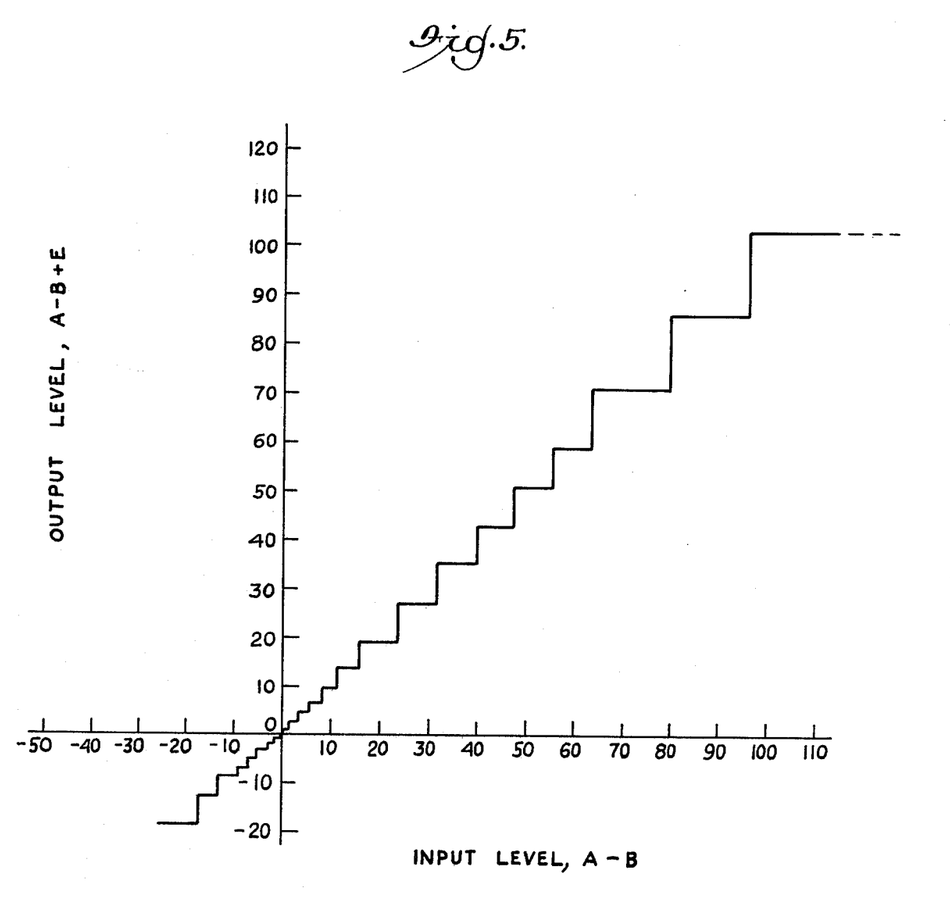
FIG. 5 is a graph illustrating the quantizing characteristic of the nonlinear quantizer shown in the block diagram of FIG. 2.
Figure 6:
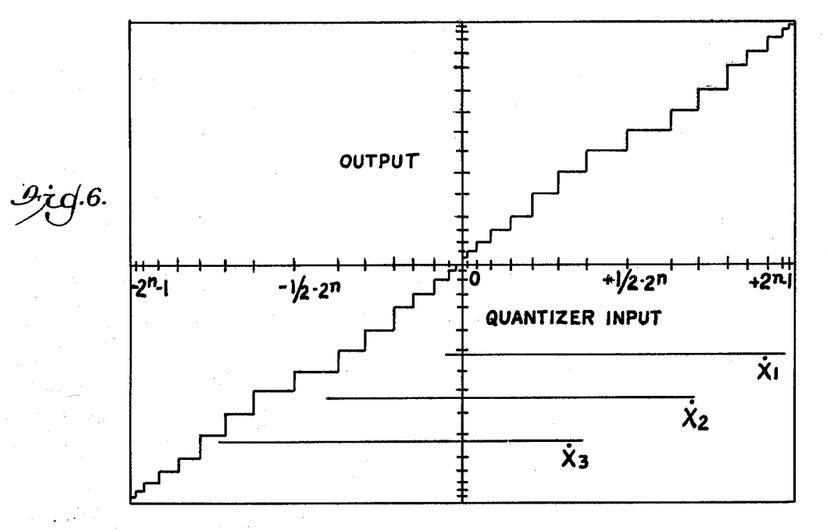
FIG. 6 is a graph illustrating another quantizing characteristic of the nonlinear quantizer shown in the block diagram of FIG. 2 which characteristic is of the Bostelmann type.

Thus, the eight bit data words (A) on line 18 are applied to a subtractor 94 to which an input line 96 is also applied, the input 96 carrying the predicted value (B) of the sample so that the output of the subtractor 94 appears on line 98 and represents the difference between the actual and predicted value (A−B) which is applied to a nonlinear quantizer 100 which can have a characteristic that carries out any one of many conventional quantizing strategies, as are well known in the differential pulse code modulation art. One nonlinear quantizing scheme is graphically illustrated in FIG. 5 which assigns each quantizing level a five bit code word plus a sign bit. While the particular nonlinear quantizing scheme is not critical to the present invention, it is preferred that the quantizer be of the Bostelmann type which has the quantizing characteristics shown in FIG. 6. The Bostelmann scheme is desirable because it takes advantage of symmetry and does not require a bit dedicated to the sign. The quantizer 100 is actually a programmable read-only memory which has an output characteristic (corresponding to that shown in FIGS. 5 or 6) which appears on line 102 (A+B+E) that is applied to an 8-to-6 bit converter 104 as well as to an adder 106. The adder 106 has an output line 108 which is applied to a three sample delay 110 having output line 96 that produces the predicted value B which is applied to the subtractor 94 as well as to the adder 106 as shown. Delay 110 and output thereof determines the predicting characteristic that predicts the value of the input based upon the values of the prior samples. The three sample delay actually utilizes the samples in the same location of the subcarrier cycle one subcarrier cycle previously which is necessary as previously described. The converter 104 converts the output signal (A−B+E) on line 102 which represents the difference between the actual and predicted values plus any quantizing error (E) into a suitable transmission code comprised of six bits.

The output of the 8-to-6 bit converter appears on line 112 which is applied to a latch 114 before it is either recorded or transmitted through a channel represented by line 22. Upon reproducing or receipt of the data in the similar latch 116, it is applied to line 118 to a 6-to-8 bit converter 120 which performs the inverse process to reestablish the same value (A−B+E) of the signal that was previously applied on line 102 and this same value is then provided on line 122 that is applied to an adder 124 to which another input 126 having the predicted value B is applied. The output of the adder 124 contains the signal A+E and appears on line 26 and represents the full eight bit original signal as applied on line 18 to the input thereof. Line 26 also applies to a delay network 128 which has output line 126 for supplying the input to the adder with the net result of adding the preceding signal, i.e., the predicted value B thereof to the difference value A−B+E appearing on line 122 and this then results in line 26 having the original value A+E.

Figure 3:
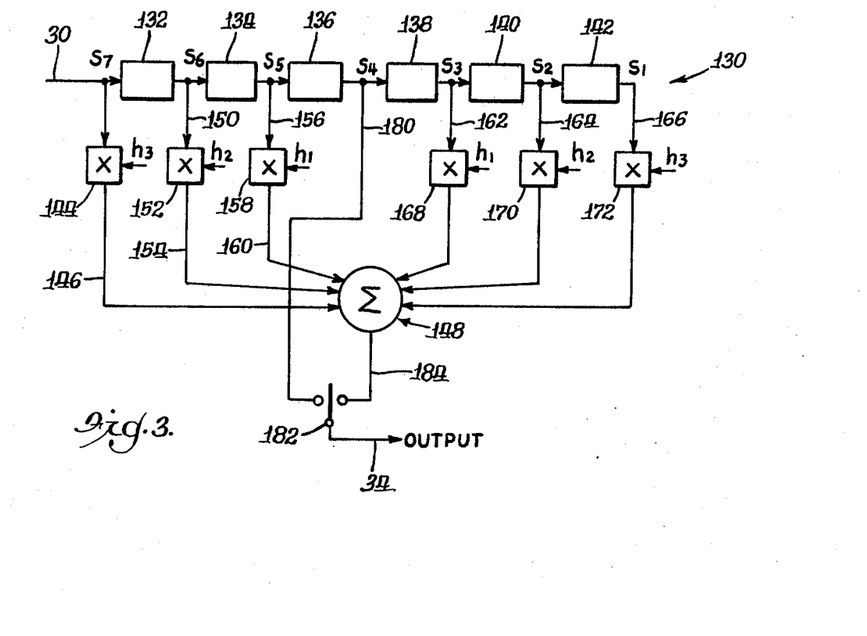
FIG. 3 is a schematic diagram of another portion of the block diagram shown in FIG. 1, and particularly illustrating the three term digital filter.

After the differential pulse code modulation subsystem has restored the data to eight bit data word form, the first process, i.e., the dropped sample subsystem operates upon the data stream on line 26 in its normal fashion and effectively utilizes the counterpart of the FIG. 7 circuitry to repeat every third sample to thereby provide the eight bit $4F_{sc}$ data stream on line 30 which is then applied to the interpolating digital filter 32 for the purpose of reconstructing the samples that had previously been dropped. Thus, when using the particular digital filter shown in FIG. 2, sample $S_4$ has been reconstructed using samples $S_1$–$S_3$ and $S_5$–$S_7$. Similarly, sample $S_8$ is reconstructed using samples $S_5$–$S_7$ and $S_9$–$S_{11}$. Other succeeding samples are similarly reconstructed using the adjacent unaltered samples in a similar manner. With a digital filter employed other than the one shown in FIG. 2, different combinations of nearby samples might be used to reconstruct the dropped sample. With the interpolated samples $S_4$, $S_8$, $S_{12}$, etc., inserted into the data stream, the original unaltered data stream is thereby reconstructed as shown in FIG. 3e and only every fourth sample represents an interpolated value. If the samples shown in FIG. 3e are again processed for recording or transmission through a transmission channel in a similar manner, it should be appreciated that errors will not propagate or be compounded by the dropped sample subsystem if the reconstructed samples are dropped, i.e., samples $S_4$, $S_8$, $S_{12}$, etc., in the illustrated embodiment.

In accordance with an important aspect of the present invention, the interpolation of the value of the reconstructed sample is made by a digital interpolating filter of unusual form and which belongs to the F.I.R. (Finite Impulse Response) class. The filter can employ two or more nonzero terms, with an increasing number of terms providing more accurate frequency response over the frequency of interest. The word "term" as used is intended to mean a pair of identical coefficients in the filter design. It should be appreciated that a larger number of terms increases the complexity and cost of the digital filter. This is compounded by the fact that it is contemplated that for applications such as commercial broadcast quality television signals, for example, each sample word has eight bits of digital information which means that individual drop sample, interpolation and interpolated sample insertion circuit components must be provided for each of the eight bits of the sample word. In this regard, it has been found that a digital filter of three terms provides adequate response at the frequencies of interest for a color television signal. It is preferred that the operation of the digital filter be such that the samples are continuously read into the digital filter and the filter output only being used at the times when a dropped sample would be located at a center tap position. This can be more fully understood in conjunction with the block diagram of FIG. 2 which has an input line 30 (actually comprising eight lines of parallel data) to a shift register 130 to which the samples are continuously applied and in the illustrated drawing, there is shown a number of stages 132, 134, 136, 138, 140 and 142 through which the samples are shifted in a generally continuous manner. It is shown that seven samples, one of which is a dropped sample, have been applied to the digital filter. The dropped samples' value is actually immaterial since its original value was discarded, and in the filter its time slot in the data stream may be occupied by anything, since that time slot is ignored. The dummy value can be zero, or as is most practically convenient and as described herein, it is a repeat of the immediately preceding sample. Thus, the sample $S_1$ appears at the output of stage 142 when sample $S_2$ appears at the output of stage 140 and the other samples correspondingly are present generally at the positions shown in the drawing. It is reiterated that the block diagram of FIG. 2 illustrates a single line and that the sample outputs will actually comprise an eight bit binary word, each bit of which would be clocked through the stages of the digital filter.

The outputs of each stage are used in generating the interpolated value of the dropped sample. More particularly, the input line 30 to the stage 132 is also applied to a multiplier 144 which has a multiplying coefficient $h_3$ to provide an output on line 146 that is applied to a summing circuit 148. Similarly, the output of stage 132 appearing on line 150 is applied to the stage 134 as well as to a multiplier 152 which has a multiplying coefficient $h_2$ that provides an output on line 154 that also extends to the summing circuit 148. In a similar manner, the output of stage 134 appears on line 156, which is applied to stage 136 as well as to a multiplier 158 having a multiplying coefficient $h_1$ to provide an output on line 160 that is extended to the summing circuit 148. Also, the outputs of stages 138, 140, 142 appear on respective lines 162, 164, 166 which extend to the associated multiplying circuits 168, 170 and 172 which have the illustrated multiplying coefficients that provide outputs on respective lines 174, 176 and 178, all of which also extend to the summing circuit 148. However, the output of stage 136 is on line 180 that extends to stage 138 and to a switch 182 which switches between line 180 and the output of the summing circuit which is on line 184.

The output of the summing circuit 148 which is the arithmetic sum of all its input signals and which appears on line 184 provides the interpolated value for the dropped sample. If the unaltered samples that are being clocked through the shift register are used except where a dropped sample had previously been located, then when the sample is to be inserted, the switch 182 will switch the output of the digital filter (line 184) to insert the interpolated value in the location in the data stream where a dummy or repeated sample had been provided and whose value was totally irrelevant and incorrect. It should be appreciated that the interpolated value must be taken from the digital filter when the dropped sample location is in the center position, i.e., where sample $S_4$ would have been present on line 180, i.e., at the output of stage 136.

For the digital filter to optimumly perform, it should be understood that certain conditions are necessary. For the application where data at a $4F_{sc}$ data rate is converted to a uniform $3F_{sc}$ rate and subsequently reconstructed back to the $4F_{sc}$ data rate, the filter has additional requirements in that all of the multiplying constants or coefficients corresponding to taps or sample locations corresponding to the center or zero position as well as positions that are integral multiples of four away from the zero position, i.e., at locations $-8$, $-4$, 0, 4, 8, etc., also have values equal to zero. Since a linear phase response is wanted, the other coefficients have finite values that are grouped in equal pairs, with each tap or sample location of a pair being equidistant from the center, i.e., the coefficient for multiplying on each side of the center of the digital filter will be the same for each position away from the center position.

Except for quantizing effects, the filter will make a perfect estimate and therefore replace the missing sample if two conditions are met. The first is that all samples must be true linear representations of the bandlimited input signal, when sampled at the original $4F_{sc}$ rate. Thus, for example, the analog-to-digital converter which provides the samples at the $4F_{sc}$ sample rate should always operate within its range of conversion. In other words, if the analog input signal exceeds the range of the A-to-D converter, then the digital signal would not be a true indication of the analog input, i.e., the A-to-D converter would have limited it. In such event, the digital signal would be incorrect and would necessarily detrimentally affect the operation of the filter and would provide an incorrect interpolated value. In other words, the input signal and A-to-D converter must operate so that the resulting samples are the digital equivalent of a linear process. The second condition is that the filter, when measured linearly, i.e., when all the samples are present in the measuring signal, has a response characteristic of unity at all frequencies in which the sampled analog signal has energy. Since a color video information signal has a larger concentration of energy at two distinct areas, i.e., at the low frequency and particularly the D.C. level and at the subcarrier frequency, the filter should have a unity response at these frequencies and the choice of coefficients for a filter can be chosen to provide exactly unity response at these frequencies of interest as well as others, depending on the number of terms. It is important that the response be unity at the subcarrier frequency and also at zero frequency. This is accomplished by determining the coefficients to obtain this response characteristic.

In general, the bandwidth and flatness of the frequency response of a digital filter is a function of the number of coefficients used and therefore of the filter complexity. For example, a five term filter generally has a flatter response through the entire frequency range of zero through the subcarrier frequency and the bandwidth is slightly wider than that of a three term bandwidth. For the application of a digital filter in reconstructing dropped samples wherein the samples are samples of a color video information signal, a three term filter performs adequately and any response errors that occur elsewhere in the passband are within acceptable limits. If the samples are from an information signal wherein the departure from unity response within the passband must be held to smaller amounts, then a more complex and therefore more expensive digital filter may be required to be compatible with the operational requirements. In practice, for a three term filter which is used to provide an interpolated value of a dropped sample where the information signal is a color video information signal, the coefficients of $h_1$ equaling 27/32, $h_2$ equaling $-\frac{1}{2}$ and $h_3$ equaling 5/32 have been found to have satisfactory performance for most purposes. These coefficients provide the unity response at the subcarrier frequency and at zero frequency and are determined using techniques that are well known to those of ordinary skill in the art of digital filter design.

Thus, referring to FIG. 2, it is seen that the $S_7$ sample value which appears on line input 30 is multiplied by the $h_3$ coefficient of 5/32, as is the value of sample $S_1$ appearing on line 166, and a smaller sample value is generated that is applied to the summer circuit 148 from the output of the multipliers 144 and 172. Similarly, the $S_6$ sample value on line 150 and the $S_2$ sample on line 164 are multiplied by the $h_2$ coefficient of $-\frac{1}{2}$ by the respective multipliers 152 and 170 to provide negative smaller sample values that are similarly applied to the summer 148. Finally, the values of samples $S_5$ and $S_3$ appearing on lines 156 and 162, respectively, are multiplied by the $h_1$ coefficient of 27/32 by the respective multipliers 158 and 168 output levels and the resulting multiplied sample values are also applied to the summer 148 via lines 160 and 174.

The digital filter shown in FIG. 2 can be reorganized to produce an equivalent structure having less complexity as is often the case in the practical building of digital filters. However, the operation of the filter is essentially that which as has been described herein so that the interpolated value for the previously dropped sample is present at the output of the switch 182 so that the output line 34 that extends to the digital-to-analog converter 36 contains the original reconstructed data stream that was previously present on line 14 applied to the sample dropper circuitry 16 in the block diagram of FIG. 1. The digital-to-analog converter 36 can be of conventional design to provide the analog video signal on line 38 if desired.

While the embodiment described herein is particularly suited for use with video information signals of a NTSC format, the apparatus and method can also be used with PAL format video information signals if one constraint is applied. If two dimensional differential pulse code modulation prediction is used with a PAL signal, the original sampling must be done with one sample located exactly on the U-color axis (the non-alternated axis) and if prediction samples containing V-axis information from the previous line are exchanged in pairs. With $4F_{sc}$ sampling and with samples located at $+U$, $+V$, $-U$ and $-V$, only $-V$ samples from the previous line are eligible for prediction of $+V$ samples in the present line and vice versa. U-axis samples are not exchanged. The additional constraint for the PAL format signal in the combined use of the differential pulse code modulation process and dropped sample is, therefore, that when two dimensional prediction is to be used, the dropped sample must be a U-axis sample, thus permitting exchange of the V samples. In this regard, an article by V. G. Devereux, entitled "Digital Video: Differential Coding of PAL Color Signals Using Same Line and Two Dimensional Prediction" is specifically incorporated by reference herein, this article appearing in British Broadcasting Corporation research department report BBC RD 1975/20. Another article entitled "A Simple High Quality DPCM-Codec for Video Telephony Using Eight M Bit Per Second" by Gert Bostelmann appearing in NACHRICHTEN-TECHN. Z. 27(1974) H. 3, S. 115–117 is also incorporated by reference herein.

From the foregoing description of the present invention, it should be appreciated that the combined use of two data rate reduction systems can be advantageously utilized in conjunction with recording or transmitting a data stream of video information. The overall reduction of the data rate is the product of the two distinct processes and with reductions to 75 percent of the original data rate for each, the overall reduction is a resulting 9/16 or 56.25 percent of the original data rate. This is such significant reduction that it may be possible to record a video signal on a single channel rather than two separate channels, without any appreciable impairment of the resulting signal.

While certain preferred embodiments of the present invention have been illustrated and described, various modifications, equivalents and alternatives thereof will become apparent to those skilled in the art. Accordingly, the scope of the present invention should be defined only by the appended claims and equivalents thereof.

Various features of the invention are set forth in the following claims.

What is claimed is:

1. A method of reducing the data rate of a data stream of multi-bit digital data words representing video information for the purpose of recording a reduced number of data words and for subsequently reconstructing the data stream upon reproducing thereof, comprising the steps of:
    dropping data words from said data stream;
    performing differential pulse code modulation on said remaining data words, thereby resulting in a reduced number of data bits per data word;
    recording said reduced bit data words;
    reproducing said reduced bit data words;

reconstructing said data words to the original multi-bit data words utilizing differential pulse code modulation; and reconstructing said data stream by generating and inserting an interpolated value in the locations where data words had been removed, said value being determined by a finite response digital filter operating on said remaining data words.

2. A method as defined in claim 1 wherein the step of reducing the number of bits of a multi-bit data word comprises:
predicting the value of each data word utilizing the preceding predicted values of data words;
calculating the difference between the predicted and actual values; and
recording the difference value, wherein the difference value has a fewer number of data bits than originally comprised the data word.

3. A method as defined in claim 2 wherein the data words are a part of a digital representation of a scene.

4. A method as defined in claim 3 wherein each of said data words represents digital samples taken at a sampling rate that is an integral multiple of the subcarrier frequency of the video signal, the predicted value of each data word being accomplished utilizing preceding predicted values of data words, wherein the preceding predicted values are integral multiples of one subcarrier cycle relative to the sample data word being predicted.

5. A method as defined in claim 2 wherein said step of reconstructing said data words to the original number of data bits per data word comprises the steps of:
utilizing said difference value to predict the value of each data word and adding the received difference value to the predicted data word value to thereby produce the data word in its original number of data bits.

6. A method as defined in claim 1 wherein the step of reducing the number of bits of a multi-bit data word comprises:
predicting the value of each data word utilizing the preceding values of data words;
calculating the difference between the predicted and actual values; and
transmitting the difference value, wherein the difference value has a fewer number of data bits then originally comprised the data word.

7. A method as defined in claim 6 wherein said step of reconstructing said data words to the original number of data bits per data word comprises the steps of:
utilizing said difference value to predict the value of each data word and adding the received difference value to the predicted data word value to thereby produce the data word in its original number of data bits.

8. A method of reducing the data rate of a data stream of multi-bit digital data words representing video information for the purpose of transmitting a reduced number of data words and for subsequently reconstructing the data stream upon receipt of the transmission thereof, comprising the steps of:
dropping data words from said data stream;
performing differential pulse code modulation on said remaining data words, thereby resulting in a reduced number of data bits per data word;
transmitting said reduced bit data words;
receiving said reduced bit data words;
reconstructing said data words to the original multi-bit data words utilizing differential pulse code modulation; and
reconstructing said data stream by generating and inserting an interpolated value in the locations where data words had been removed, said value being determined by a finite response digital filter operating on said remaining data words.

9. A method of reducing the data rate of a data stream of data words of video information for the purpose of transferring a fewer number of data words and subsequently reconstructing said data stream, comprising the steps of:
dropping each $n^{th}$ data word from said data stream;
reducing the number of data bits per data word utilizing differential pulse code modulation;
reconstructing the data words to the original number of data bits per data word utilizing differential pulse code modulation subsequently of transferring; and
reconstructing said data stream by generating and inserting an interpolated value in the locations where data words had been removed, said value being determined by a finite impulse response digital filter operating on said remaining data words.

10. Apparatus for reducing the data rate of a data stream of data words of video information for the purpose of transferring a fewer number of data words and subsequently reconstructing said data stream, comprising:
means for dropping each $n^{th}$ data word from said data stream;
means for performing differential pulse code modulation on said remaining data words to thereby reduce the number of data bits per data word;
means for performing differential pulse code modulation on said reduced bit data words subsequently of transferring to thereby reconstruct the data words to the original number of data bits per data word; and
means for reconstructing said data stream by generating and inserting an interpolated value in the locations where data words had been removed.

11. Apparatus as defined in claim 10 wherein said means for reconstructing said data stream further comprises:
means for generating an interpolated value for each of said dropped samples, said generating means comprising a multi-term finite impulse response digital filter means into which said data stream samples are applied, said filter means operating on said samples and providing an interpolated value at the output thereof; and
means connected to said generating means for inserting a generated interpolated value into the data stream at each location where a sample had been dropped.

12. Apparatus as defined in claim 11 wherein said video information signal is a color video information signal having a chroma subcarrier, said digital filter means comprising a digital filter having at least three terms and a frequency response of approximately unity at least at zero frequency and at the frequency of the chroma subcarrier of said video information signal.

13. Apparatus as defined in claim 10 wherein said means for performing differential pulse code modulation comprises:

means for predicting the value of each data word utilizing the preceding predicted values of data words; and means for calculating the difference between the predicted and actual values.

14. Apparatus for reducing the data rate of a data stream of multi-bit digital data words representing video information for the purpose of transferring a reduced number of data words and for subsequently reconstructing the data stream, comprising:

means for dropping data words from said data stream;

means for performing differential pulse code modulation on the remaining data words to thereby provide a reduced number of data bits per data word;

means for transferring said reduced bit data words;

means for receiving said reduced bit data words;

means for reconstructing said data words to the original multi-bit data words utilizing differential pulse code modulation; and means for reconstructing said data stream by generating and inserting an interpolated value in the locations where data words had been dropped, said value being determined by a finite response digital filter operating on said remaining data words.

15. Apparatus for reconstructing a data stream upon receipt of the transfer thereof, wherein said data stream has had data words dropped therefrom and the remaining data words contain a reduced number of data bits per data word as a result of differential pulse code modulation having been performed on said remaining data words, comprising:

means for receiving said reduced bit data words;

means for reconstructing said data words to the original multi-bit data word length utilizing differential pulse code modulation; and means for reconstructing said data stream by generating and inserting an interpolated value in the locations where data words have been removed, said value being determined by operation of a finite impulse response digital filter operating on said remaining data words.

16. Apparatus for reducing the data rate of a data stream of multi-bit digital data words representing video information for the purpose of transferring a reduced number of data words, comprising:

means for dropping data words from said data stream; and means for performing differential pulse code modulation on said remaining data words to thereby produce a reduced number of data bits per data word for subsequent recording and/or transmitting thereof.

* * * * *